Figure 1:
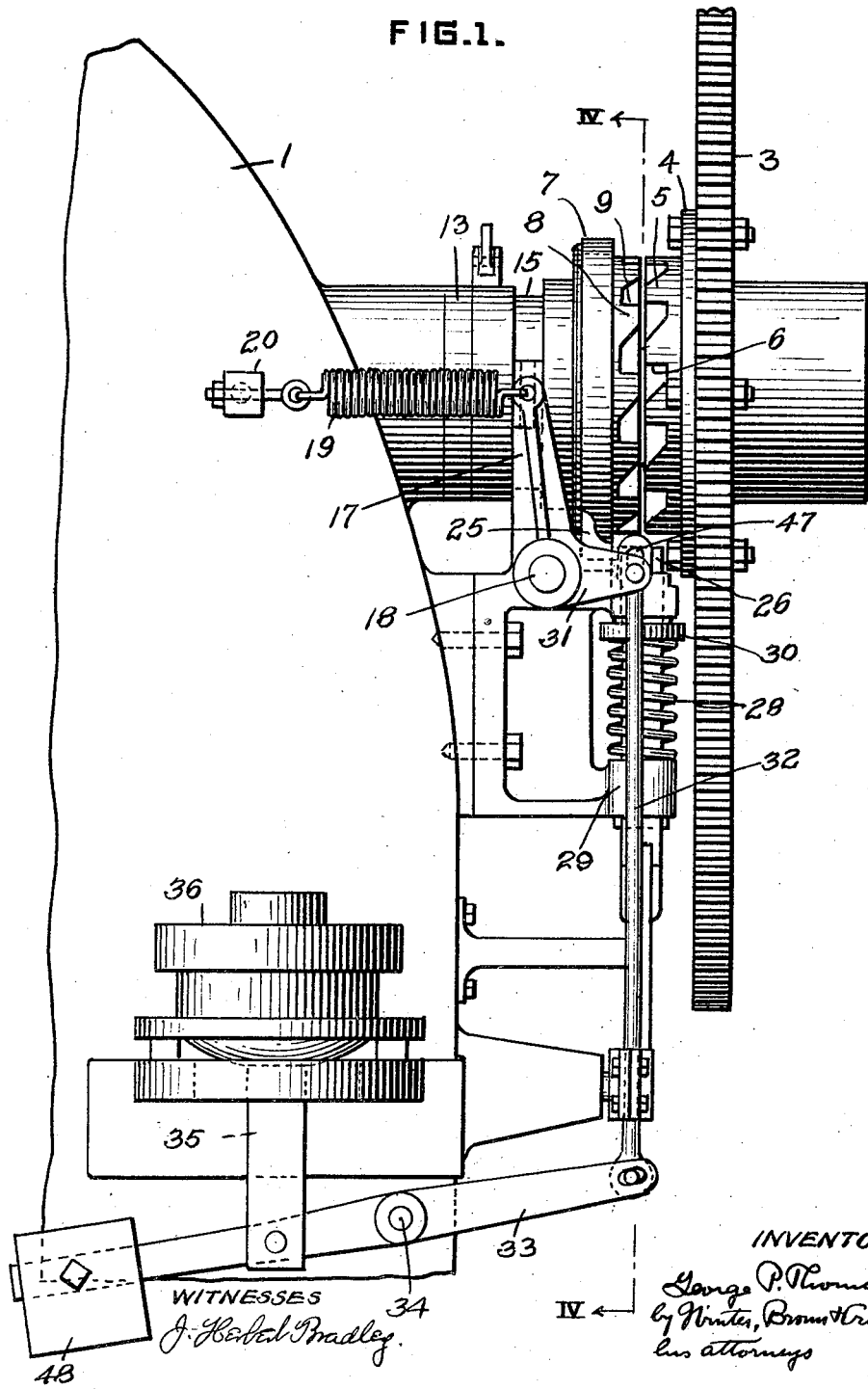

Oct. 9, 1928.

G. P. THOMAS

CLUTCH

Filed May 8, 1925

1,686,584

3 Sheets-Sheet 1

Oct. 9, 1928.
G. P. THOMAS
1,686,584
CLUTCH
Filed May 8, 1925   3 Sheets-Sheet 2
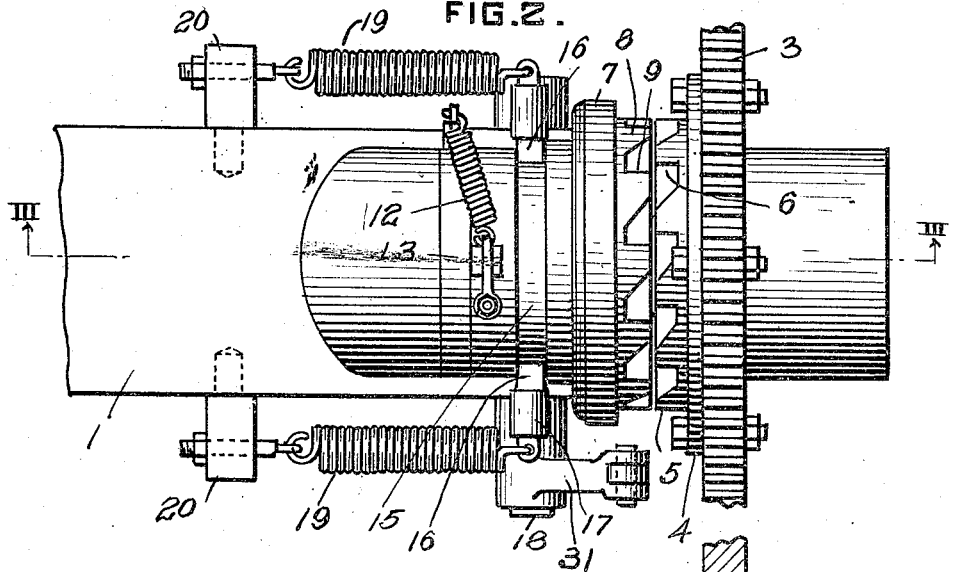
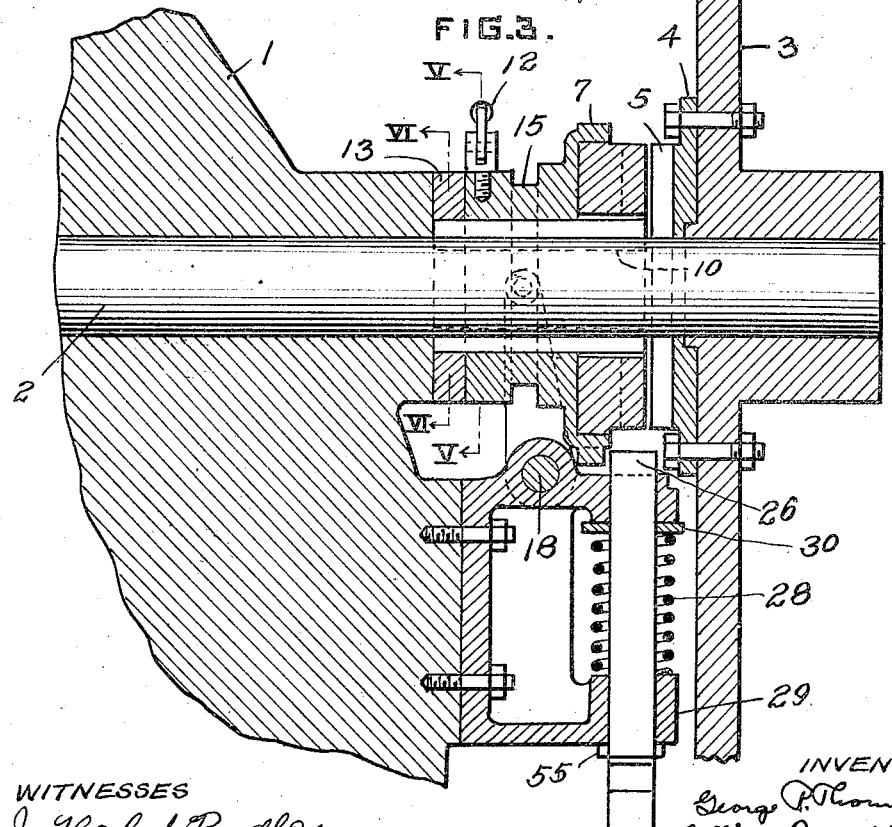

Oct. 9, 1928.
G. P. THOMAS
1,686,584
CLUTCH
Filed May 8, 1925
3 Sheets-Sheet 3
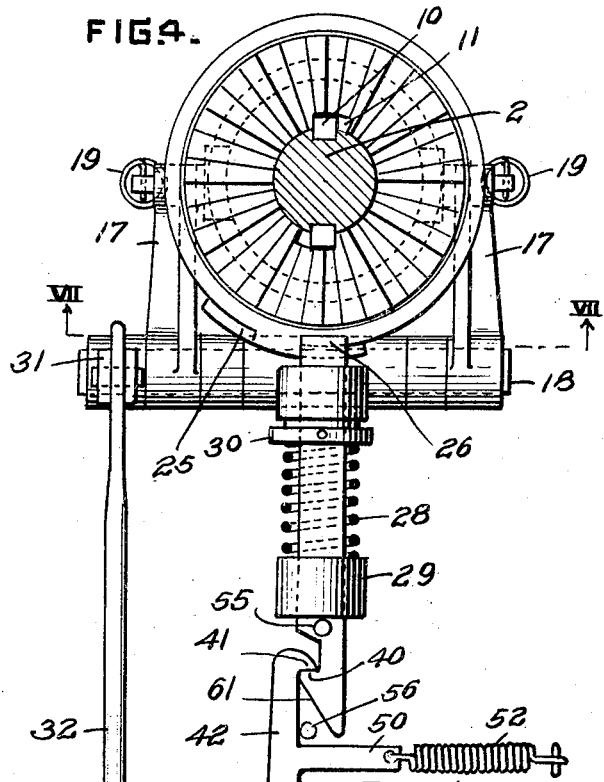
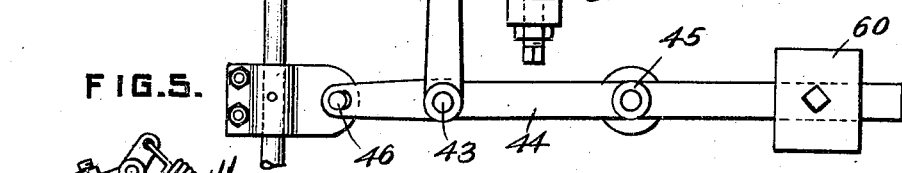
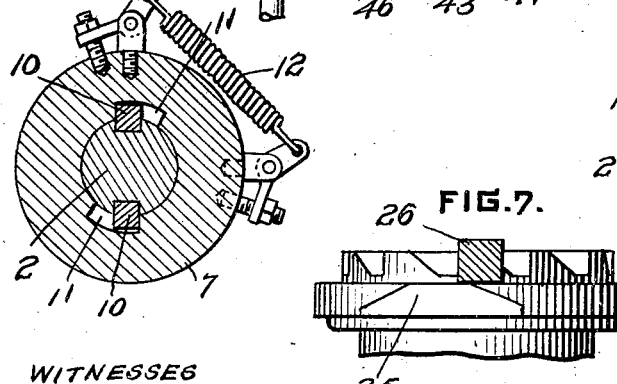
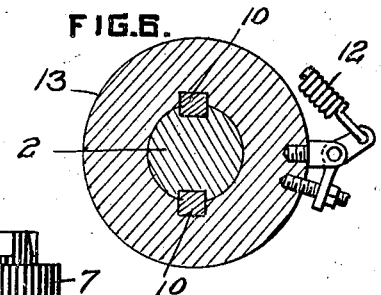
WITNESSES
J. Herbert Bradley
INVENTOR
George P. Thomas,
by Winter Brown & Critchlow,
his attorneys.

Patented Oct. 9, 1928.

1,686,584

UNITED STATES PATENT OFFICE.

GEORGE P. THOMAS, OF GLENSHAW, PENNSYLVANIA.

CLUTCH.

Application filed May 8, 1925. Serial No. 28,797.

The invention relates to clutches of the type used on various kinds of intermittently operating machines, such as machines used for perforating, cutting, stamping or pressing metal, although the invention is unlimited to use on any particular kind of machine.

As usually constructed, a clutch for a machine of the kind mentioned includes two clutch elements, one of which is immovably attached to a driving member, and the other of which is a ring feathered upon a driven member for rotation with and longitudinally movable on it, the adjacent faces of the clutch elements being provided with teeth adapted to engage each other. The power transmitted through such clutches is so great that, as soon as the driving faces of the teeth on the movable ring are engaged by those of the teeth on the driving member, the ring cannot be moved farther into clutch-closing or making position. Frequently the teeth of the two clutch elements are in only partial mesh when the driving faces engage each other. The result is that power is transmitted through only the outer ends of the teeth, which causes undue wear on them, and sometimes breaks them, to overcome which is one object of this invention.

Furthermore, the movable clutch ring of such clutches is usually urged toward clutch making or closing position by a spring, and is moved to and held in clutch-breaking position, against the resistance of the spring, by a movable pawl or finger which has sliding contact with a lug formed on the ring, and which, accordingly is subjected to considerable wear. Due to such wear on the pawl, as well as to wear on other parts of the clutch mechanism, and due also to other causes incident to the continuous pressure of the clutch ring toward clutch-closing position, the normal retracted position of the clutch ring gradually approaches the other clutch element until the outer ends of the teeth of the two clutch elements meet. This results in the ends of the clutch teeth becoming worn down, and sometimes results in the clutch teeth sufficiently engaging each other to transmit power to the driven member at a time when it is not desired. A further object of the invention is to overcome these objectionable features, and at the same time provide a quick-acting clutch.

The invention is illustrated in the accompanying drawings, of which Fig. 1 is a side view of a clutch mechanism arranged to transmit power to the driven element of a machine; Fig. 2 a plan view of the mechanism shown in Fig. 1; Fig. 3 a vertical sectional view taken on the line III—III, Fig. 2; Fig. 4 a vertical sectional view taken substantially on the line IV—IV, Fig. 1; Figs. 5 and 6 transverse sectional views taken, respectively, on the lines V—V and VI—VI, Fig. 3; and Fig. 7 a bottom view of a movable clutch ring and a sectional view of a pawl for moving it, the plane of view being generally indicated by the line VII—VII, Fig. 4.

That the teeth of the clutch elements may always be brought into full engagement with each other before power is transmitted through them, the clutch ring is mounted for limited angular movement upon and with relation to the member which carries it, and is yieldingly urged in an angular direction opposed to that of the rotation of the driving and driven members, the arrangement being such that in case the outer ends of the driving faces of the cooperating clutch elements immediately engage each other when the clutch ring is moved to close the clutch, the clutch ring may be farther moved to bring the clutch teeth into full engagement with each other before power is transmitted through the clutch. As far as concerns this feature of the invention, the clutch ring may be variously moved to and from clutch-closing position, and may be variously maintained in clutch-breaking position. To prevent undesirable consequences incident to the continuous urging of the clutch ring towards clutch-making position, such ring is, according to another feature of the invention, continuously urged toward clutch-breaking position, and provision is made for positively moving it into clutch-making position. Preferably, the clutch ring is urged toward and maintained in clutch-breaking position by a spring, and is moved into clutch-making position by a lever which is moved against the resistance of such spring.

Having reference to the illustrative embodiment of the invention, the frame 1 of a punching machine is shown as being provided with a driven member in the form of a rotatable shaft 2 which, through suitable connections well known to those skilled in the art, imparts reciprocation to a punching head. Frequently it is desired to rotate shaft 2 one complete revolution so as to effect a single reciprocation of the punching head, and to then stop its rotation so that the material being punched may be moved. The clutch illustrated herein is arranged to effect such operation, although it will be understood that the invention is not limited to a clutch for this particular purpose.

On the outer end of shaft 2 there is rotatably mounted a driving member in the form of a gear wheel 3, which may be continuously rotated by a motor. Attached to the face of gear 3, and surrounding shaft 2, there is a clutch element 4 provided on its vertical face with clutch teeth 5, the driving faces of which are indicated at 6. On shaft 2 there is mounted for longitudinal movement to and from clutch element 4 a clutch ring 7 provided on its vertical face with teeth 8, the driving faces of which are indicated at 9.

To so mount ring 7 on shaft 2 that it may have a limited angular movement upon the shaft before power is transmitted through it, the shaft is provided with keys 10 (Fig. 5) adapted to be received by grooves 11 (Figs. 4 and 5) of greater widths than the keys. Ring 7 is normally urged in an angular direction opposite to the direction of rotation of the driving and driven members by means of a spring 12 which is connected at one end to ring 7 and at its other end to a disk 13, which, as shown in Fig. 6, is so keyed to shaft 2 that it has no angular movement with relation to it. By so mounting ring 7, the transmission of power through the clutch does not take place until after clutch element 4 has moved ring 7 angularly upon shaft 2 a distance corresponding to the difference between the width of a groove 11 and its contained key 10. During such interval ring 7 may be moved longitudinally to bring the cooperating clutch teeth into full engagement with each other.

For positively moving ring 7 longitudinally, it is preferably provided with an annular groove 15 engaged by trunnions 16 attached to lever arms 17, which in turn are secured to a rock shaft 18. The ring may be normally urged to its clutch-breaking position indicated in the drawings by means of tension springs 19 attached at their ends to levers 17 and to blocks 20 borne by frame 1. In this way the teeth 8 of ring 7 are maintained out of contact with the teeth 5 of clutch element 4 during such times as the clutch elements are out of engagement with each other.

Before explaining the means for moving ring 7 longitudinally into clutch-making position against the resistance of springs 19, the means for moving it into clutch-breaking position will be described. For the latter purpose, the rim of ring 7 is provided with a laterally extending lug 25 having beveled ends as shown in Figs. 1 and 7, and a finger or pawl 26 is arranged for movements transversely of the longitudinal movement of this ring, the end of the pawl being adapted to be engaged by a beveled end of the lug when the clutch is closed and rotation is imparted to ring 7 to cause the lug to move in an annular path. Preferably pawl 26 is yieldingly urged into the annular path of lug 25 by means of a spring 28 acting between a support 29, attached to frame 1, and a collar 30 attached to the pawl. The engagement of the pawl by the lug occurs near the end of a complete revolution of shaft 2, and further rotation of the shaft to complete its revolution causes pawl 26 to press against and move ring 7 out of engagement with clutch element 4. Both ends of lug 25 are beveled so that in case it becomes necessary to rotate the driving and driven members in the direction opposite from that incident to the normal operation of the machine, the clutch may be opened and injury to pawl 26 may be avoided.

Before ring 7 is moved longitudinally into engagement with clutch element 4, it is necessary to remove pawl 26, which may be done in various ways, but which is preferably done by the positively acting means for moving ring 7 into engagement with clutch element 4, which positively acting means will now be explained. Attached to shaft 18 there is an arm 31 pivotally connected at its outer end to the upper end of a rod 32, the lower end of which rod is pivotally attached to a lever 33, Fig. 1. This lever may be pivoted at 34 to frame 1, and is preferably actuated by the movable armature 35 of a solenoid 36 which may be energized manually or in coordination with the operation of a punching machine in various manners, as for example, in coordination with the rotation of shaft 2 in the manner fully disclosed in my copending patent application, Serial No. 722,447. The energizing of the solenoid causes armature 35 to rise, which moves the outer end of lever 33 downwardly to cause ring 7 to move into clutch-making position through the connections just explained.

Between this clutch-moving mechanism and pawl 26 connections are provided for moving the pawl from the annular path of lug 25 before clutch ring 7 is moved into clutch-making position. For this purpose the lower end of pawl 26 is preferably provided with a latch 40 adapted to be engaged by a hook 41 formed on the end of a finger 42 which is pivotally attached at 43 to a lever 44. This lever is pivotally mounted at 45 on frame 1, and is pivotally connected at 46 to rod 32 so that the downward movement of this rod moves finger 42 downwardly, and in consequence thereof withdraws pawl 26 from the longitudinal path of movement of lug 25. The upper end of rod 32 is provided with a slot 47 at its point of pivotal connection to the outer end of arm 31, and such rod may be held upwardly by a counter-weight 48 attached to lever 33 and a counter-weight 60 attached to lever 44, so that the initial downward movement of rod 32 does not cause arm 31 to move downwardly, and therefore does not cause clutch ring 7 to move into clutch-making position. It will be seen from this that the downward movement of rod 31, effected by the energizing of solenoid 36, first moves pawl 26 downwardly and thereafter moves clutch ring 7 longitudinally.

Provision is made for releasing pawl 26 shortly after it has been withdrawn from the longitudinal path of lug 25, so that the pawl may quickly return to the position in which it lies in the annular path of the lug. For this purpose, lever 42 is provided with a laterally extending arm 50, which, when the lever is moved downwardly, strikes a vertically adjustable stop 51 attached to frame 1, and causes finger 42 to move to the left, as viewed in Fig. 4, against the resistance of a spring 52 which normally holds the finger in its indicated position. This movement of finger 42 to the left carries its hooked end 41 out of engagement with latch 40 so that the latch may immediately be moved by spring 28 into the annular path of lug 25. The upward movement of pawl 26 may be limited by a pin 55 adapted to engage the lower end of collar 29, and the movement of finger 42 to the right may be limited by a pin 56 attached to frame 1. The lower end of latch 40 is provided with a beveled face 61 to cause finger 42 to move outwardly when the finger moves upwardly under the action of counter-weights 48 and 60.

In the complete operation of the clutch-moving mechanism, assuming clutch ring 7 to be in clutch-breaking position, the downward movement of rod 32 first removes pawl 26 from its position in the longitudinal path of movement of lug 25 of ring 7, and thereafter moves ring 7 into clutch-making position. The final downward movement of rod 32 causes finger 42 to release the lower end of pawl 26 so that it may quickly return, under the action of spring 28, into the annular path of lug 25. When this lug is engaged by the pawl, ring 7 is moved from clutch-making position, and, as soon as the teeth of the clutch are thus disengaged, springs 19 move the ring further outwardly and maintain it yieldingly in clutch-breaking position. This construction affords a quick acting clutch, and makes it impossible for more than one cycle of operation of the machine to be effected by one movement of clutch ring 7 into clutch-making position.

The clutch elements 4 and 7 are engaged by the axial movement of the ring 7 in the direction of the member 4 which is effected by the solenoid 36 through the movable armature 35 and the linkage 33, 32 and the lever 17 which operates the trunnions 16. The solenoid is energized to actuate its armature thereby engaging the clutch teeth which are maintained in operative engagement by virtue of the torque transmitted thereby until the pawl 26 engages the lug 25 of the ring 7 to disengage the clutch element. The solenoid is energized only temporarily to engage the clutch and is deenergized during the operation of the clutch after its teeth 5 and 8 are engaged.

According to the provisions of the patent statutes, I have explained the principle and operation of my invention, and have illutrated and described what I now consider to represent its best embodiment. However, I desire to have it understood that, within the scope of the appended claims, the invention may be practiced by other forms of construction than that particularly illustrated and described.

I claim as my invention:

1. In a clutch mechanism, the combination with a rotatable driving member provided with a toothed clutch element, a driven member, a toothed clutch ring mounted on said driven member for rotation with it and for longitudinal movement on it to and from engagement with said clutch element and provided with a laterally extending lug; of means for yieldingly maintaining said ring in clutch-breaking position, positive means for moving said ring into clutch-making position against the resistance of said first-named means, a pawl yieldingly urged into the annular path of said lug for moving the clutch ring from engagement with said clutch element, connections between said pawl and said positive ring-moving means for moving the pawl from the longitudinal path of said lug before said ring is moved longitudinally into clutch-making position, and means for breaking said connection after said ring has been moved longitudinally into clutch-making position.

2. In a clutch mechanism, the combination with a rotatable driving member provided with a toothed clutch element, a driven member, a toothed clutch ring mounted on said driven member for rotation with it and for longitudinal movement on it to and from engagement with said clutch element and provided with a laterally extending lug; of means for yieldingly maintaining said ring in clutch-breaking position, positive means for moving said ring into clutch-making position against the resistance of said first-named means, a pawl yieldingly urged into the annular path of said lug for moving the clutch ring from engagement with said clutch element, connections including a pivoted latch between said pawl and said positive ring-moving means for moving the pawl from the longitudinal path of said lug before said ring is moved longitudinally into clutch-making position, and means for releasing said pivoted latch to break said connections after said ring has been moved longitudinally to clutch-making position.

In testimony whereof, I sign my name.

GEORGE P. THOMAS.